(12) United States Patent
Park et al.

(10) Patent No.: US 9,547,371 B2
(45) Date of Patent: Jan. 17, 2017

(54) USER INTERFACE APPARATUS AND METHOD FOR CONTROLLING THE SAME

(71) Applicant: KOREA INSTITUTE OF SCIENCE AND TECHNOLOGY, Seoul (KR)

(72) Inventors: Jung-Min Park, Seoul (KR); Wonsang Hwang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 14/293,566

(22) Filed: Jun. 2, 2014

(65) Prior Publication Data

US 2015/0205362 A1 Jul. 23, 2015

(30) Foreign Application Priority Data

Jan. 17, 2014 (KR) ........................ 10-2014-0005980

(51) Int. Cl.
  *G06G 5/00* (2006.01)
  *G06F 3/01* (2006.01)
  *G06F 3/0481* (2013.01)
  *G06F 3/0484* (2013.01)
  *G06F 3/03* (2006.01)

(52) U.S. Cl.
  CPC ............... *G06F 3/017* (2013.01); *G06F 3/013* (2013.01); *G06F 3/0304* (2013.01); *G06F 3/04815* (2013.01); *G06F 3/04842* (2013.01)

(58) Field of Classification Search
  CPC G06F 3/0481; G06F 3/04815; G06F 3/04845; G06T 19/006
  USPC ........................................................ 345/156
  See application file for complete search history.

(56) References Cited

U.S. PATENT DOCUMENTS

2002/0135618 A1\* 9/2002 Maes .................... G06F 3/0481 715/767
2014/0184496 A1\* 7/2014 Gribetz et al. ................ 345/156

FOREIGN PATENT DOCUMENTS

| KR | 10-2009-0124172 A | 12/2009 |
|---|---|---|
| KR | 10-2013-0108643 A | 10/2013 |
| KR | 10-2013-0123116 A | 11/2013 |
| WO | WO 2012/082971 A1 | 6/2012 |

OTHER PUBLICATIONS

Tanriverdi, Vildan, and Robert JK Jacob. "Interacting with eye movements in virtual environments," Proceedings of the SIGCHI conference on Human factors in computing systems. ACM, 2000.

(Continued)

*Primary Examiner* — Gustavo Polo
(74) *Attorney, Agent, or Firm* — NSIP Law

(57) ABSTRACT

The present disclosure relates to a multi-dimensional user interface apparatus that selects an object by sensing a motion of a user and a control method thereof.

The user interface apparatus according to the present disclosure includes an eye gaze sensing unit to sense eye positions and eye gaze directions of a user, and a hand shape sensing unit to sense a hand shape of the user, wherein the user interface apparatus calculates a position factor related to a location of an object from the eye positions and the eye gaze directions, calculates at least one conformity factor related to a conformity between the hand shape and the object from the hand shape, and determines the object as a target selected by the user based on the calculated position factor and the at least one conformity factor.

7 Claims, 12 Drawing Sheets

(56) References Cited

OTHER PUBLICATIONS

Olwal, Alex, Hrvoje Benko, and Steven Feiner. "SenseShapes: Using statistical geometry for object selection in a multimodal augmented reality system," Proceedings of the 2nd IEEE/ACM International Symposium on Mixed and Augmented Reality. IEEE Computer Society, 2003.

Grossman, Tovi, and Ravin Balakrishnan. "The design and evaluation of selection techniques for 3D volumetric," Proceedings of the 19th annual ACM symposium on User interface software and technology. ACM, 2006.

Wang, Robert, Sylvain Paris, and Jovan Popović. "6D hands: markerless hand-tracking for computer aided design." Proceedings of the 24th annual ACM symposium on User interface software and technology. ACM, 2011.

* cited by examiner

USER INTERFACE APPARATUS AND METHOD FOR CONTROLLING THE SAME

CROSS-REFERENCE TO RELATED APPLICATION

This application claims priority to Korean Patent Application No. 10-2014-0005980, filed on Jan. 17, 2014, and all the benefits accruing therefrom under 35 U.S.C. §119, the contents of which in its entirety are herein incorporated by reference.

BACKGROUND

1. Field

The disclosure relates to a user interface apparatus and method for controlling the same, and more specifically, to a multi-dimensional user interface apparatus and method that sense a motion of a user to select an object.

2. Description of the Related Art

Recently, with the wide spread of computer-enabled electronic devices such as laptop computers, smart phones, and the like, the methods of recognizing a user command have been diversified: For example, a two-dimensional (2D) selection method using a mouse, a selection method using tracking a user hand motion on a space, or a selection method using a 6 degree-of-freedom (DOF) handheld input device has been proposed.

However, the above conventional methods are inconvenient to select an object, because they require three steps. For a user to select an object, the user determines the target th select, locate a 2D or 3D cursor on the object using a mouse or 6 DOF handheld input device, and finally trigger some confirmation mechanism like pressing a button.

This three-step selection mechanism takes not only user fatigue, but also relatively more time. Accordingly, it is required for new user interface means to improve user intuitiveness and usability without cumbersome steps.

SUMMARY

The disclosure is directed to providing a user interface apparatus that may select a target without the cumbersome selection steps and method for controlling the same.

In one aspect, the propose user interface apparatus includes an eye gaze sensing unit and a hand pose sensing unit. The apparatus uses the eye gaze sensing unit to sense the eye positions and the eye gaze directions of a user and calculates a position factor. It relates the difference between the position of the eye gaze and the position of an object. The apparatus uses the hand pose sensing unit to senses a hand pose of the user and calculates an angle conformity factor and a magnitude conformity factor. It relates the difference between the hand pose of the user and the geometry of an object. The apparatus determines the target which the user wants to select, with at least one conformity factor.

The user interface apparatus may determine a user eye gaze from the eye positions and the eye gaze directions, and may calculate the position factor from a minimum distance between the user eye gaze and the object.

The user eye gaze may be ray that starts from a midpoint of the eye positions and goes in an average eye gaze direction of the eye gaze directions.

The user interface apparatus may calculate the at least one conformity factor based on a relationship (or similarity) between the hand pose and the geometry of the modified geometry of an object. The hand pose may represent an appearance of a hand such as the pose of the hand, the size of the hand, the location of each part of the hand, the relative location between the parts of the hand, the extent to which each part of the hand is bent, or the angle recognized from the appearance of the hand. The geometry of the object or the modified geometry may represent the appearance, the geometrical structure, the dimension, or the attitude angle of the object or the modified geometry.

The user interface apparatus may calculate the cost of objects by substituting the position factor and the conformity factors to a predetermined discriminant, and selectively determines the object as the target by comparing the cost of the object to the costs of other objects.

The discriminant may be as follows:

$$\text{cost} = k_{gaze} \cdot d_{gaze} + k_{mag} \cdot d_{mag} + k_{angle} \cdot \theta.$$

Additionally, the user interface apparatus may include a display unit to display the object.

The object may be a stereoscopic image or a stereoscopic product that is displayed in three dimensions by a display unit.

In another aspect, there is provided a control method of a user interface apparatus. It includes calculating the first data related to the location of an object based on the eye gaze of a user, and calculating the second data related to the geometry of the object or the modification product based on the hand pose of the user, wherein the modification product may be produced by transforming the object. Additionally, the control method may include determining a user-selected target using the first data and the second data.

The first data may include a distance factor representing a distance between the eye gaze of the user and the object.

The second data may include a magnitude factor and an angle factor representing conformity between the hand pose of the user and the geometry of the object or the modified one.

The target determination may include calculating the cost of objects by substituting the first data and the second data to a predetermined discriminant, comparing the cost of the object to the cost of other objects, and selecting the object as the target based on the result of the comparison.

According to the embodiments, the user interface apparatus may select or recognize the target selected by a user without cumbersome selection steps, when the user just see the target and do the grasping pose.

DETAILED DESCRIPTION

Figure 1:
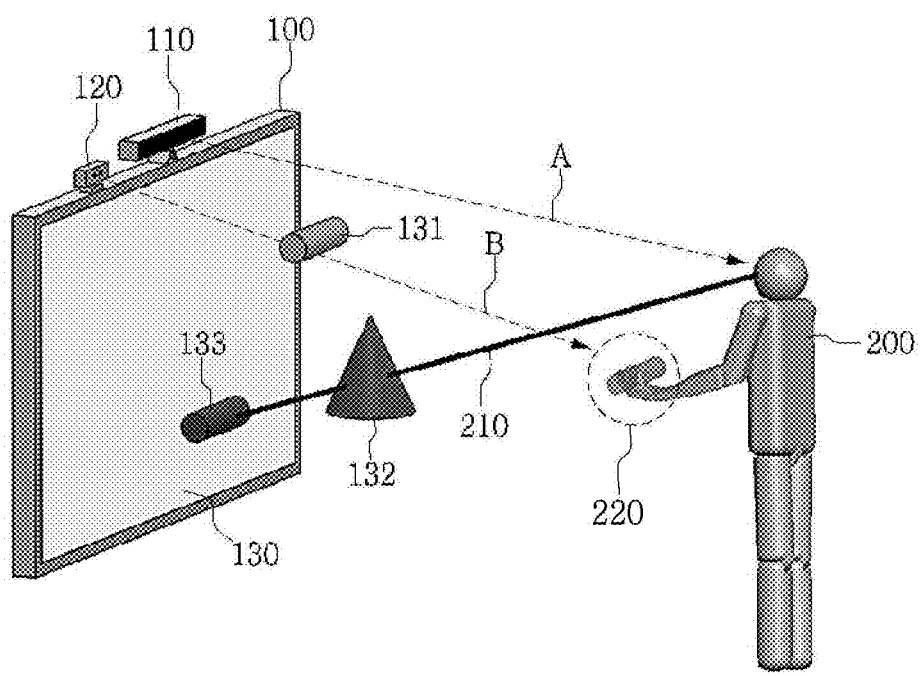
FIG. 1 is a perspective view illustrating a user interface apparatus according to an embodiment.

The disclosure now will be described more fully hereinafter with reference to the accompanying drawings, in which particular exemplary embodiments are shown. It should be understood that various embodiments of the disclosure are different from each other but do not need to be mutually exclusive. For example, particular shapes, structures, and features stated herein may be embodied differently as another embodiment within the scope of this disclosure.

Also, it should be understood that the locations and the placement of individual elements in each of the disclosed embodiments may be modified and changed within the scope of this disclosure. Therefore, the following detailed description does not intend to limit the scope of this disclosure. The scope of this disclosure is defined, in principle, by the appended claims and encompasses every embodiments covered under the literal scope of the claims and the equivalent scope thereto. When similar reference numerals are used in the drawings, similar reference numerals denote identical or similar functions in many embodiments.

FIG. 1 is a perspective view illustrating a user interface apparatus according to an embodiment. Referring to FIG. 1, the user interface apparatus 100 includes an eye gaze sensing unit 110, a hand pose sensing unit 120, and a display unit 130. The user interface apparatus 100 displays a plurality of objects 131, 132, and 133 to a user 200, and detects the object which the user wants to select among the plurality of objects.

The eye gaze sensing unit 110 senses the eye gaze of the user A, and considers which object the eye gaze 210 points. The eye gaze sensing unit 110 detects how distant the sensed eye gaze of the user is away from each of the plurality of objects 131, 132, and 133. The calculated result may be outputted or stored as a position factor.

The hand pose sensing unit 120 senses the hand pose of the user B, and consider which object the hand pose 220 of the user matches among the plurality of objects 131, 132, and 133. In other words, by comparing the hand pose 220 of the user to sizes and shapes of the objects 131, 132 and 133, the hand pose sensing unit 120 calculates how close the hand pose 220 of the user is to the objects. The calculated result may be outputted or stored as a conformity factor.

The display unit 130 displays the plurality of objects 131, 132, and 133 to the user 200, and the shown graphics corresponds to object selection and manipulation by the user 200. The display unit 130 may include various three-dimensional (3D) displays such as a 3D display using stereoscopy and parallax barrier, a holography display, a 3D volumetric display, or a 3D plasma display using laser.

Meanwhile, although not shown in FIG. 1, the user interface apparatus 100 may further include a control unit (not shown). This unit may control the eye gaze sensing unit 110, the hand pose sensing unit 120, and the display unit 130, and perform various calculations necessary for operation of the user interface apparatus 100. The control unit may be included or embedded in any of the eye gaze sensing unit 110, the hand pose sensing unit 120, and the display unit 130, or may be implemented as an independent module separately from the eye gaze sensing unit 110, the hand pose sensing unit 120, and the display unit 130.

The user interface apparatus 100 recognizes the eye gaze 210 and the hand pose 220 of the user through the eye gaze sensing unit 110 and the hand shape sensing unit 120, and detects the target 133 which the user wants to select among the plurality of objects 131, 132, and 133. Also, the user interface apparatus 100 controls a motion or shape of the target 133 in response to following user manipulation inputs (for example, taking a hand shaking or gripping pose). For example, when the user 200 intuitively manipulates the target 133, for example, holds and shakes the target 133, even in the absence of an explicit target pointing manipulation, the user interface apparatus 100 may recognize the target 133 from the eye gaze 210 and the hand pose 220 of the user and move a location of the target 133 in response to the shaking motion of the user 200.

By this method, the user interface apparatus 100 may recognize the target 133 selected by the user and respond to a subsequent user manipulation without extra manipulation for object selection such as placing a two-dimensional (2D) cursor or a 3D cursor on an object or executing a separate selection menu.

Meanwhile, a specific construction and an operation method of the eye gaze sensing unit 110 and the hand pose sensing unit 120, and a method using the result of these units and determining the target for a user to select is described in detail below with reference to FIG. 3.

This embodiment describes that the eye gaze sensing unit 110 and the hand pose sensing unit 120 are independent on the display unit 130 in terms of hardware configuration, but this is for illustration only. The scope of the present disclosure is not limited by this exemplary embodiment. For example, the eye gaze sensing unit 110 and the hand pose sensing unit 120 may be embedded in the display unit 130. Further, the eye gaze sensing unit 110 and the hand shape sensing unit 120 may construct as a single interface module being physically separate from the display unit 130.

Also, although this embodiment shows that the 3D objects 131, 132, and 133 are displayed and selected, the scope of the present disclosure is not limited thereto and may include an embodiment in which 2D objects are displayed on a plane and selected by sensing an eye gaze and a hand pose of a user. In this case, the display unit 130 may include various 2D displays such as a Liquid Crystal Display (LCD), a Plasma Display Panel (PDP), a Lighting Emitting Diode (LED), or a Field Emission Display (FED).

According to the above embodiments, the user interface apparatus may select or recognize a target intended/selected by a user without an extra manipulation only for object selection, just by recognizing an eye gaze and a hand pose of the user. Also, because the time required for an extra manipulation is eliminated, the user interface apparatus may operate more quickly. Further, the user interface apparatus recognizes a target in the more intuitive way compared to conventional arts, and contributes to improvements of user intuitiveness and usability.

Figure 2A:
FIGS. 2A and 2B are schematic diagrams illustrating a manipulation method of a user interface apparatus according to an embodiment and a related art being compared thereto.
Figure 2B:
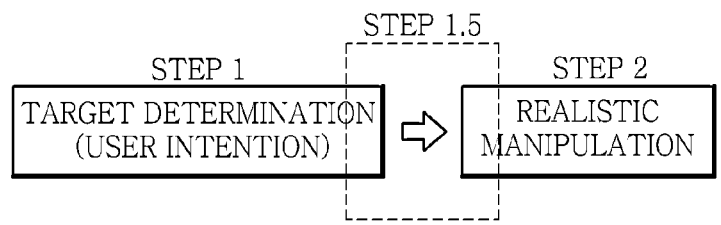

FIGS. 2A and 2B are schematic diagrams illustrating the manipulation processes of a user interface apparatus according to the embodiment and the conventional art being compared thereto. FIG. 2A shows the process of selecting and manipulating a target according to the conventional arts. FIG. 2B shows the process of selecting and manipulating a target according to the present disclosure.

In FIG. 2A, for a user to select and manipulate an object according to the conventional arts, an overall process is roughly classified into three steps, STEP 1, STEP 2, and STEP 3.

First, in STEP 1, the user inwardly determines a target, an object intended to select. This is said to be the step of determining an intention of the user, and in this step, the conventional art cannot obtain any selection information from the user.

Subsequently, in STEP 2, the user performs a selection manipulation on a device for the device to recognize the determined target. The selection manipulation represents any operation of user whereby some of plural objects is designated as a target. The selection manipulation includes, for example, placing a mouse cursor on an object or executing or selecting a menu pointing a particular object.

Finally, in STEP 3, the user performs a realistic manipulation, for example, shaking, pushing, pulling, or twisting the selected target while holding the target on the device.

According to the conventional art, STEP 2 is necessarily required, which causes inconvenience to the user, and the user has no choice but to endure some extent of time delays until to start a realistic manipulation (STEP 3) after target determination (STEP 1) is completed.

In FIG. 2B, the present disclosure involves only two steps STEP 1 and STEP 2 for a user to select and manipulate an object. A selection operation step STEP 1.5 corresponding to STEP 2 of FIG. 2A is inherent in between STEP 1 and STEP 2 of FIG. 2B, rather than being classified as a separate step.

In STEP 1, the user inwardly determines a target, an object intended to select. In this step, the user inwardly determines a target in such a manner of viewing displayed objects and eventually keeping an eye on the target. In this step, the user interface apparatus according to the present disclosure acquires the first data necessary to determine the target (for example, a position factor related to a location of the target), by recognizing and tracking an eye gaze of the user.

Subsequently, in STEP 2, the user performs a realistic manipulation of the selected target. In this instance, for realistic manipulation, the user naturally takes a hand pose fitting to shape of the target. For example, if the target is in a rod-like shape, the user would grip a hand with fingers close together to select the object. Or, if the target is in a spherical shape, the user would grip a hand with fingers open as if the user holds a ball. In this step, the user interface apparatus according to the present disclosure acquires the second data necessary to determine the target (for example, conformity factors related to the shape of the target) by recognizing the hand pose of the user. And, the user interface apparatus determines the target by referring to the first data and the second data synthetically, and responds to a realistic manipulation of user.

In this way, the present disclosure may provide for determining the target without an extra manipulation only for selecting the target on the device, and the data necessary to determine the target is naturally acquired from a user activity inherent in between STEP 1 and STEP 2.

Figure 3:
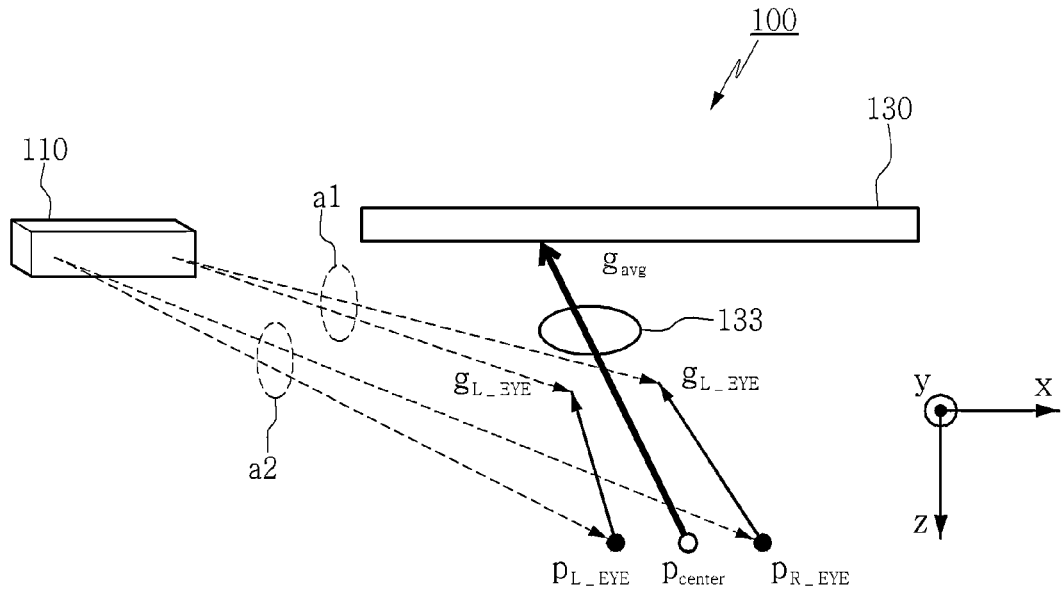
FIG. 3 is a diagram illustrating a method of sensing a user eye gaze by a user interface apparatus according to an embodiment.

FIG. 3 is the diagram illustrating the method of sensing a user eye gaze by the user interface apparatus according to an embodiment. Referring to FIG. 3, the user interface apparatus 100 derives a user eye gaze from an eye position and an eye gaze direction of a user.

In FIG. 3, the object 133 is displayed in front of the display unit 130. The eye gaze sensing unit 110 measures each position ($p_L$, $p_R$) of both eyes of a user a2, and calculates a midpoint $p_{center}$ between both eye positions. Also, the eye gaze sensing unit 110 measures each gaze direction ($g_L$, $g_R$) of both eyes (a1), and calculates an average eye gaze direction $g_{avg}$. The midpoint $p_{center}$ and the average eye gaze direction $g_{avg}$ are calculated by Equation 1.

$$p_{center} = \frac{p_L + p_R}{2} \quad \text{[Equation 1]}$$
$$g_{avg} = \frac{g_L + g_R}{2}$$

Here, $p_L$, $p_R$, $g_L$, $g_R$, $p_{center}$, and $g_{avg}$ are all vectors having a magnitude and a direction.

Also, the average user eye gaze is determined from the calculated midpoint $p_{center}$ and the calculated average eye gaze direction $g_{avg}$ as represented by Equation 2.

$$p_{center} + t \cdot g_{avg}, t > 0 \quad \text{[Equation 2]}$$

The user eye gaze of Equation 2 is a vector represented in a form of a half line(ray) by the midpoint $p_{center}$ and the average eye gaze direction $g_{avg}$, and in this instance, t denotes a real number greater than 0.

Through this method, the user interface apparatus 100 may calculate one half-line user eye gaze from the eye position and the eye gaze direction of the user.

Figure 4:
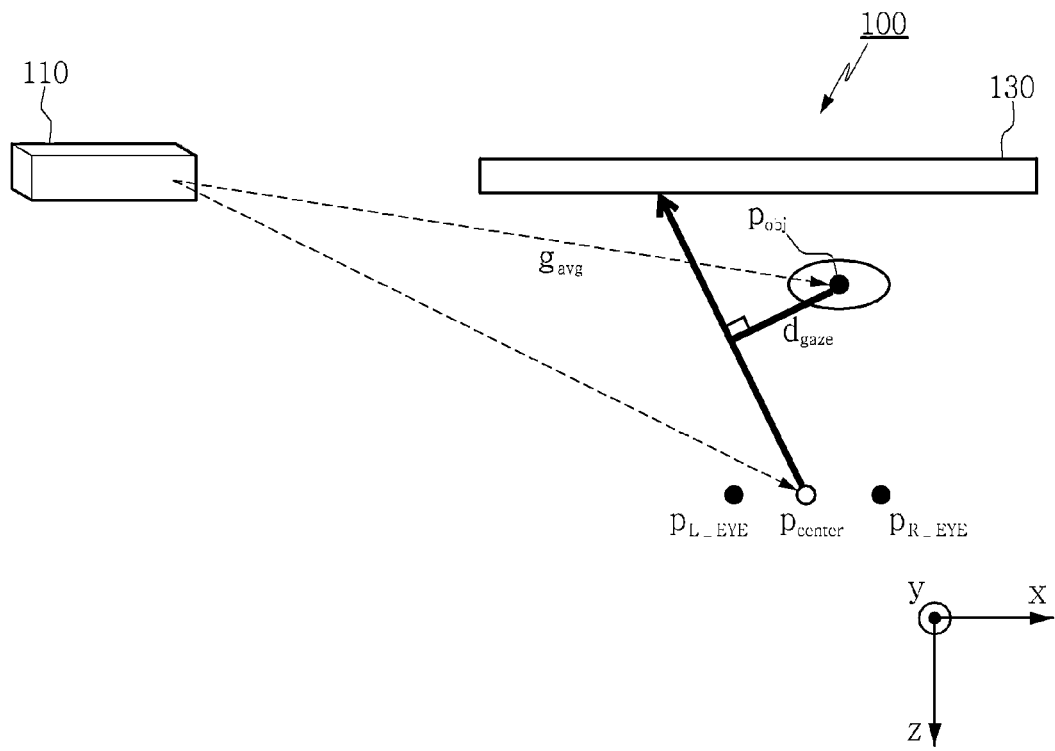
FIG. 4 is a diagram illustrating a method of calculating the position factor of an object from a user eye gaze sensed by a user interface apparatus according to an embodiment.

FIG. 4 is the diagram illustrating a method of calculating the position factor of the object from the user eye gaze sensed by the user interface apparatus according to the embodiment. Referring to FIG. 4, the user interface apparatus 100 detects the center position $p_{obj}$ of the object 133, calculates the minimum distance $d_{gaze}$ between the object center and the user eye gaze, and determines a result of the calculation to a position factor.

The midpoint $p_{center}$ and the average eye gaze direction $g_{avg}$ are calculated from the positions ($p_L$, $p_R$) of both eyes and the gaze directions of both eyes as described in FIG. 3, and make up one user eye gaze directing from the midpoint $p_{center}$ to the display unit 130.

The eye gaze sensing unit 110 senses the object center $p_{obj}$ of the object 133, and calculates the minimum distance $d_{gaze}$ between the user eye gaze of Equation 2 and the object center $p_{obj}$. The minimum distance $d_{gaze}$ is calculated by Equation 3.

$$d_{gaze} = \left| (p_{obj} - p_{center}) - \frac{(p_{obj} - p_{center}) * g_{avg}}{|g_{avg}|^2} g_{avg} \right| \quad \text{[Equation 3]}$$

Here, $p_{center}$, $p_{obj}$, and $g_{avg}$ are a vector having a magnitude and a direction, and $d_{gaze}$ is a scalar quantity having only a magnitude. Here, the object center $p_{obj}$ is the center point of specifying the position of the object 133. For example, the object center $p_{obj}$ may be the center of mass of the object 133.

The minimum distance $d_{gaze}$ is calculated for each object, respectively. The minimum distance may be newly calculated when the location of the object 133 or the user eye gaze changes. For example, if a number of displayed objects are three (131, 132, and 133 of FIG. 1), corresponding minimum distances are calculated for the objects respectively, and after that, when the objects or a user eye gaze moves, new minimum distances are calculated for the objects based on the changed location of the object or the changed user eye gaze.

The calculated minimum distance $d_{gaze}$ may be outputted or stored as a position factor indicating the relationship between the location of the object 133 and the user eye gaze. As described later, the position factor functions as an independent variable of the discriminant (Equation 8 below) used for the user interface apparatus 100 to determine a target.

Meanwhile, hereinabove, calculations for obtaining the midpoint $p_{center}$, the average eye gaze direction $g_{avg}$, the user eye gaze, and the minimum distance $d_{gaze}$ may be performed by, for example, a processor in the eye gaze sensing unit 110, but the scope of the present disclosure is not limited thereto. For example, such calculations may be performed by other part of the user interface apparatus 100 or by using a separate external calculation device.

Hereinafter, the method that senses a hand pose of a user and calculates conformity between a shape of an object and the hand pose of the user is described with reference to FIGS. 5 through 10.

Figure 5:
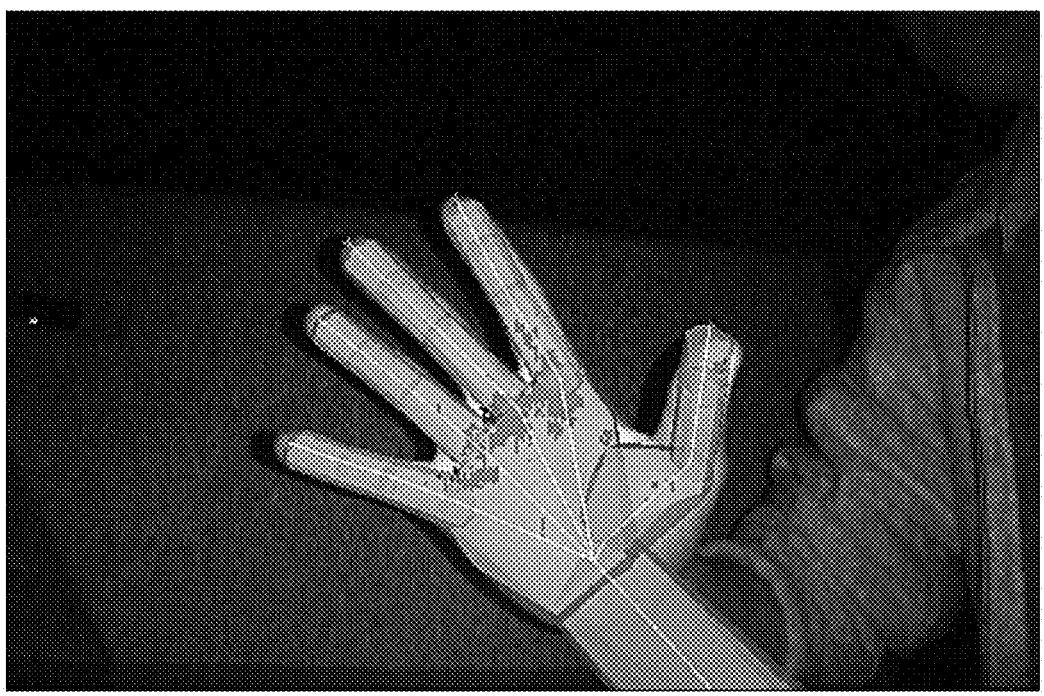
FIG. 5 is a projected image view illustrating an exemplary method of sensing a hand shape.

FIG. 5 is a projected image view illustrating an exemplary method of sensing a hand pose. Referring to FIG. 5, sensing finger shape or motion using a depth image camera is shown.

Although FIG. 5 shows Creative Senz3D as a depth image camera, various other depth image cameras such as Primesense Carmine or Microsoft Kinect may be used.

Also, although FIG. 5 shows Intel Skeletal Hand Tracking Library as a hand pose sensing technology, other hand pose sensing technologies such as 3Gear Systems 3Gear Development kit may be used.

Using the exemplary depth image camera and the exemplary hand pose sensing technology, 3D location information representing a human hand pose or a location per knuckle may be collected in real time. Since specific construction and method of the depth image camera and the hand pose sensing technology is well known in the art, its detailed description is omitted herein for the sake of brevity.

Figure 6:
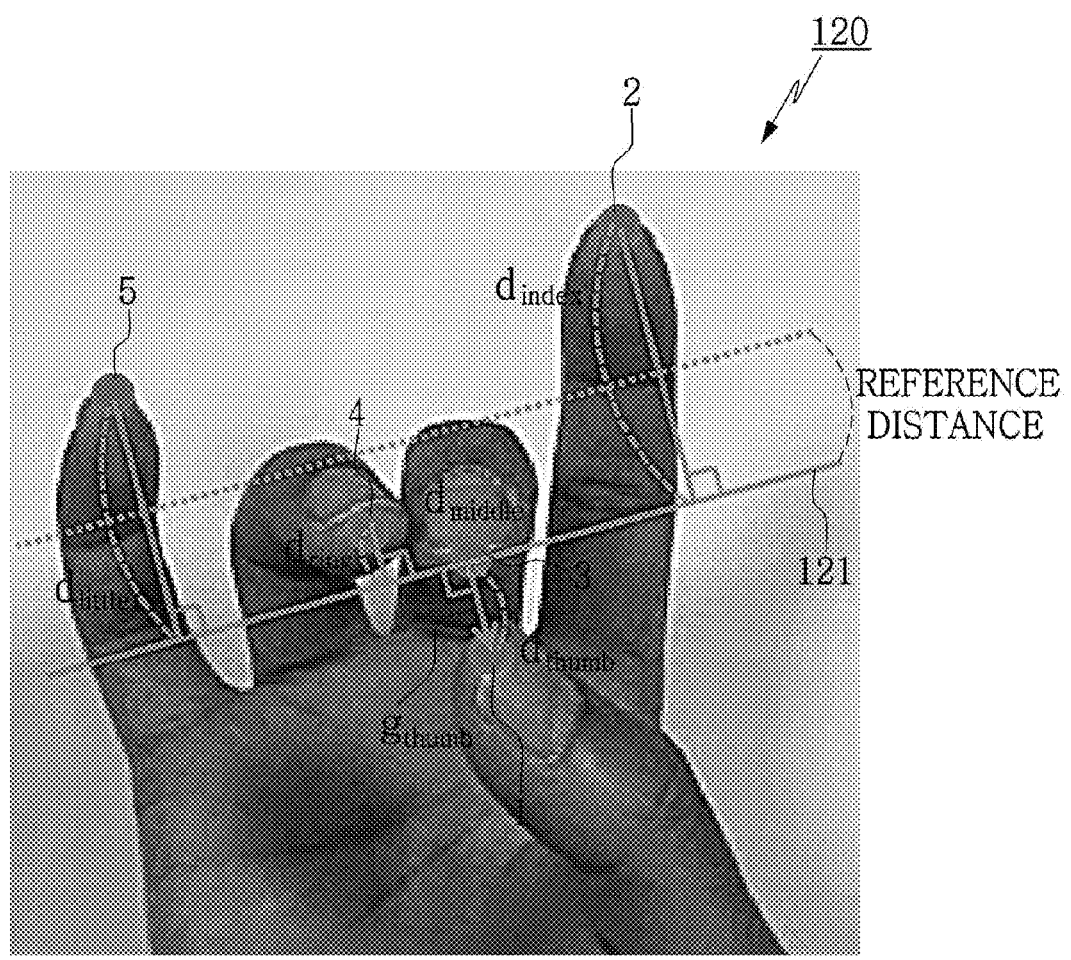
FIG. 6 is a view illustrating a method of determining the finger contributing to object selection based on the hand pose of a user by a user interface apparatus according to an embodiment.

FIG. 6 is a view illustrating the method of determining the fingers contributing to object selection based on a hand pose of a user by the user interface apparatus according to an embodiment. In FIG. 6, the user interface apparatus (See 100 of FIG. 1) senses a hand pose of a user using the hand pose sensing unit 120, and determines fingers contributing to object selection from the hand pose.

In this instance, the hand pose includes not only an appearance or a pose of a hand, but also a size of the hand, a location of each part of the hand, a relative location between the parts of the hand, an extent to which each part of the hand is bent, or an angle recognized from the appearance of the hand. For example, the hand pose includes the start location and the end location of each finger and the relative location between them. In the embodiment shown in FIG. 6, the hand shape sensing unit 120 senses a 3D location 1, 2, 3, 4, and 5 for each finger tip. In this instance, the finger tip location may be obtained using the depth image camera and the hand pose sensing technology described in FIG. 5.

Subsequently, the fingers contributing to object grasp is determined from the sensed finger tip locations 1, 2, 3, 4, and 5), and among fingers, a thumb is regarded as always participating in grasp. For the other fingers, the apparatus 100 calculates the distances between the location of the thumb tip 1 and each of them 2, 3, 4, or 5 and determines which fingers participates in the grasp, using the distances. A detailed method for determining the participating fingers is as follows.

First, a finger tip location (3 in FIG. 6) closest to the thumb tip 1 is identified.

A plane is determined as a reference plane 121. The normal vector of it is a vector $g_{thumb}$ connecting the closest finger tip 3 and the thumb tip 1. The plane includes the closest finger tip 3.

Subsequently, the distances between the determined reference plane 121 and each of the finger tips $d_{thumb}$, $d_{index}$, $d_{middle}$, $d_{ring}$, and $d_{little}$ is calculated. The distance between the reference plane 121 and the finger tip may be calculated by Equation 4.

$$d_{fingertip} = \left| (p_{fingertip} - p_{closest}) \cdot \frac{g_{thumb}}{|g_{thumb}|} \right| \qquad \text{[Equation 4]}$$

Here, $d_{fingertip}$ represents the distances $d_{thumb}$, $d_{index}$, $d_{middle}$, $d_{ring}$, and $d_{little}$ between the reference plane 121 and each of the finger tips, $g_{thumb}$ represents a normal vector of the reference plane 121, $p_{fingertip}$ represents the vector indicating each of the finger tip locations 1, 2, 3, 4, and 5, and $p_{closest}$ represents a vector indicating the closest finger tip location 3.

The distances $d_{thumb}$, $d_{index}$, $d_{middle}$, $d_{ring}$, and $d_{little}$ calculated by Equation 4 are each compared to a reference distance, and if the distance is larger than the reference distance, the corresponding finger is determined to be a non-participating finger, and if the distance is smaller than the reference distance, the corresponding finger is determined to be a finger participating in grasp.

As described in the foregoing, it is assumed that the thumb always participates in grasp, and the closest finger 3 also always participates in grasp since the reference plane 121 includes the closest finger tip and the distance $d_{middle}$ between the reference plane 121 and the closest finger 3 is always zero. Among the other fingers, a finger with smaller distance than the reference distance is only a ring finger. Therefore, the thumb, the middle finger, and the ring finger are determined as the fingers participating in grasp. In contrast, the index finger and the little finger are determined as a non-participating finger since the distance $d_{index}$ of the index finger and the distance $d_{little}$ of the little finger are larger than the reference distance.

Figure 7:
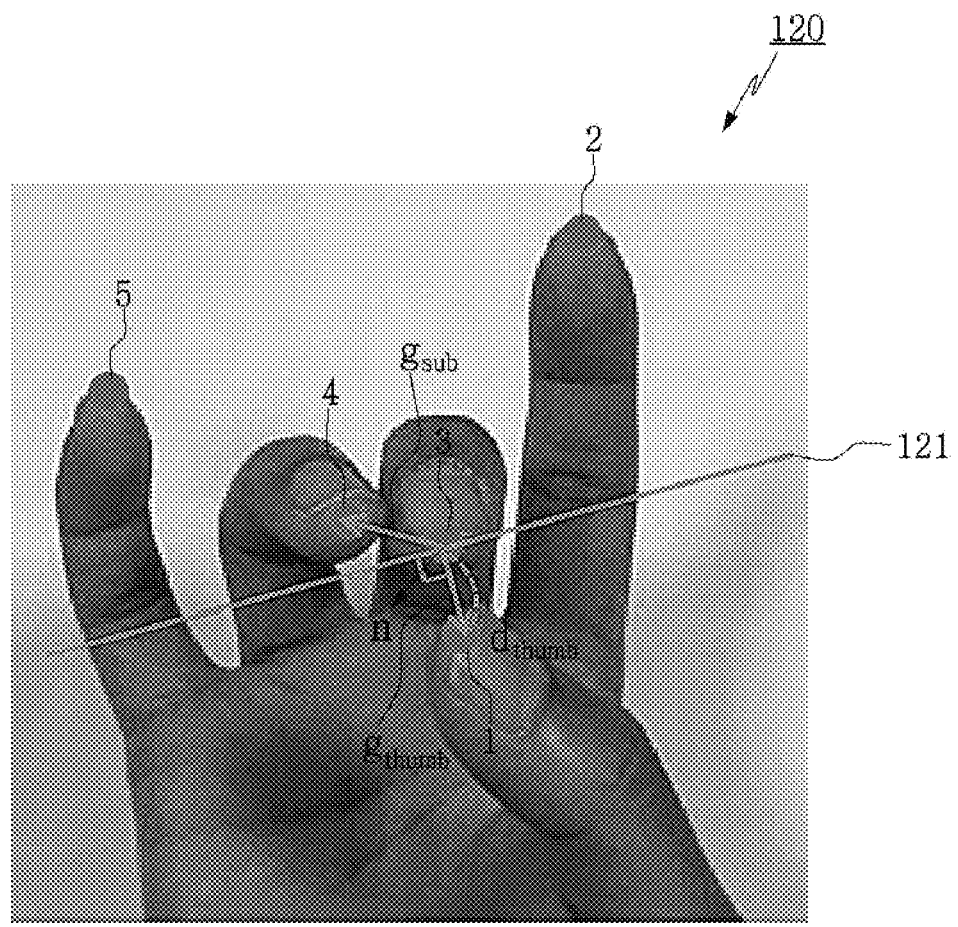
FIG. 7 is a view illustrating a method of determining the projection plane on which objects are to be projected, from the fingers participating in grasp.
Figure 8:
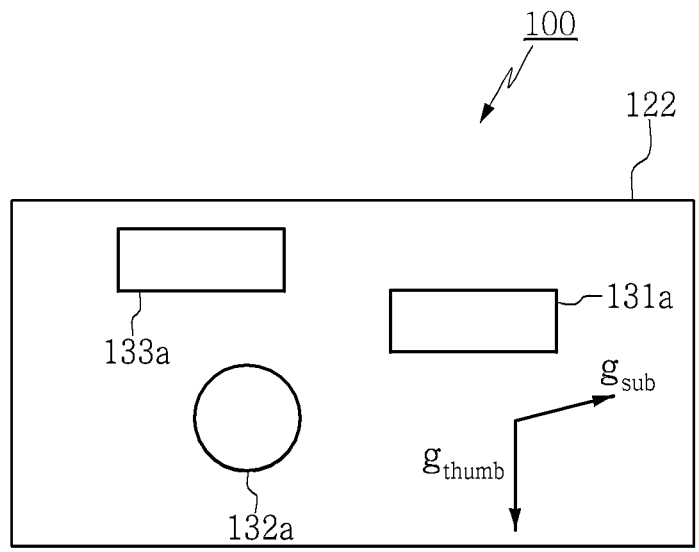
FIG. 8 is a plane view illustrating the result of projecting objects on the projection plane determined in FIG. 7.

In FIGS. 7 and 8, the method of determining conformity between the object and the location of the finger participating in grasp is described. In this instance, the conformity of the object may be determined by comparing the hand pose to the shape of the modification product which has modified geometry of the object. However, alternatively, the conformity of the object may be determined by comparing the hand pose and the shape of the object directly. Here, the shape of the object or the modification product may include an appearance and a size of the object or the modification product and an angle recognized from the appearance of the object or the modification product. In FIG. 7 below, a geometric product generated by projecting an object on a projection plane is illustrated as the modification product of the object.

FIG. 7 is a view illustrating the method of determining a projection plane on which objects are to be projected, in reference to the fingers participating in the grasp. In FIG. 7, the user interface apparatus 100 determines a projection plane using the finger tip location sensed by the hand shape sensing unit 120.

The user interface apparatus 100 calculates a subvector $g_{sub}$ connecting the closest finger tip 3 and the second closest finger tip 4 to the thumb tip 1 in the fingers participating in the grasp (that is, the thumb, the middle finger, and the ring finger).

And, the user interface apparatus 100 calculates a normal vector 'n' of the plane including the normal vector $g_{thumb}$ of the reference plane 121 and the subvector $g_{sub}$. The normal vector 'n' may be calculated by Equation 5.

$$n = \frac{g_{sub} \times g_{thumb}}{|g_{sub} \times g_{thumb}|} \qquad \text{[Equation 5]}$$

Subsequently, the user interface apparatus 100 determines, as a projection plane is perpendicular to the normal vector 'n' of Equation 5 and passes through an origin. Here, the origin may be any point on the user eye gaze, any point on the display unit 130, or any point on the display unit (See 130 of FIG. 1) to which the user eye gaze of Equation 2 goes. The projection plane is used to project the objects (131, 132, and 133 of FIG. 1) on a 2D plane.

FIG. 8 is a plane view illustrating the result of projecting the object on the projection plane determined in FIG. 7.

In FIG. 8, the user interface apparatus 100 projects all points on surfaces of the 3D objects (See 131, 132, and 133 of FIG. 1) on the projection plane 122. A set of projected points compose projections 131a, 132a, and 133a of the objects. Positions of the points projected on the projection plane 122 may be calculated by Equation 6.

$$p_{proj.p} = p_p - n \cdot (p_p \cdot n) \qquad \text{[Equation 6]}$$

Here, $p_p$ represents a vector indicating positions of points on the surface of the object, $p_{proj.p}$ represents a vector indicating positions at which the points are projected on the projection plane 122, and 'n' represents a normal vector of the projection plane 122 calculated by Equation 5.

The user interface apparatus 100 determines conformity with the user hand pose in reference to a size and a shape of the calculated projections 131a, 132a, and 133a. Its description is provided below with reference to FIG. 9.

Figure 9:
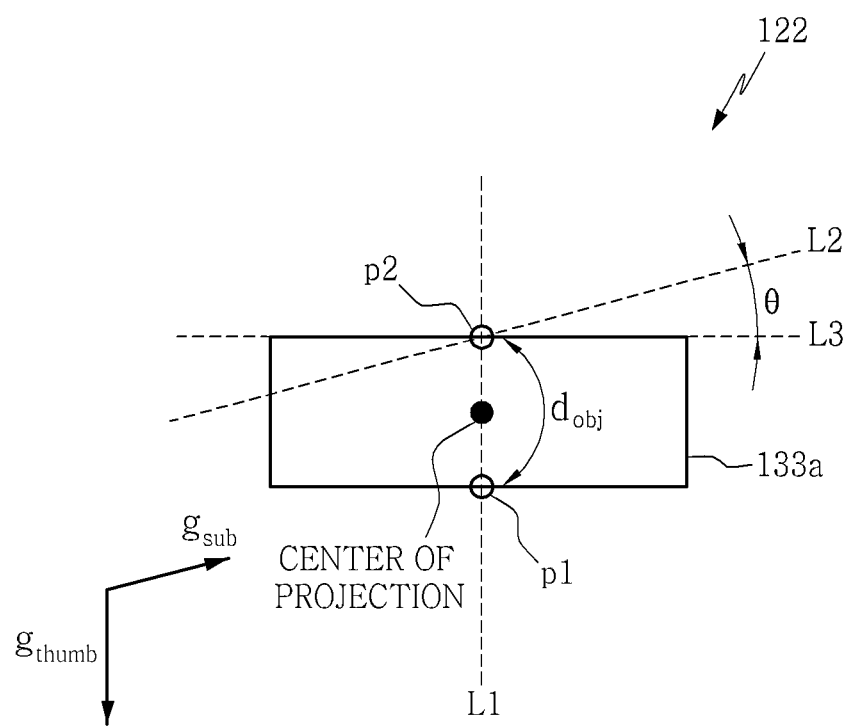
FIG. 9 is a diagram illustrating a method of calculating conformity factors indicating the objects conformity with the hand pose of a user, from the projection of FIG. 8.

FIG. 9 is a diagram illustrating the method of calculating conformity factors indicating conformity with the user hand shape, from the projection of FIG. 8. Referring to FIG. 9, the user interface apparatus (See 100 of FIG. 1) calculates conformity factors (for example, a size factor and an angle factor) from the projection 133a projected on the projection plane 122.

The user interface apparatus 100 determines the first straight line L1 that passes through the center of the projection 133a and is parallel to the normal vector $g_{thumb}$ of the reference plane 121.

Also, the user interface apparatus 100 determines two points p1 and p2 at which the first straight line meets the outline of the projection 133a. In this instance, the first point p1 is a point located in the positive direction of the subvector $g_{sub}$ from the center of the projection, and the second point p2 is a point located in the negative direction of the normal vector $g_{thumb}$ from the center of the projection. Here, the center of the projection is the center point of the projection 133a, for example, a point corresponding to the object center (See $p_{obj}$ of FIG. 4) of the object projected on the projection plane 122.

And, the user interface apparatus 100 determines the second straight line L2 that passes through the second point p2 and is parallel to the subvector $g_{sub}$.

And, the user interface apparatus 100 determines, as the third straight line L3, a tangent line of the projection at the second point p2.

Subsequently, the user interface apparatus 100 calculates conformity factors, based on the first straight line L1, second straight line L2, third straight line L3, first point p1, and second point p2.

In this instance, the conformity factors include a magnitude factor $d_{mag}$ related to the observed size of the object 133 or the size of the projection 133a, and the angle factor θ related to the observed shape of the object 133 or the shape of the projection 133a.

The magnitude factor $d_{mag}$ is calculated by Equation 7.

$$d_{mag} = |d_{obj} - d_{thumb}| \qquad \text{[Equation 7]}$$

Here, $d_{mag}$ represents a magnitude factor to obtain, $d_{obj}$ represents the distance between the first point p1 and the second point p2, and $d_{thumb}$ represents the distance between the thumb tip location (See 1 of FIG. 6) and the finger tip closest from the thumb tip (See 3 of FIG. 6).

Meanwhile, the angle factor θ is an angle between the second straight line L2 and the third straight line L3.

The calculated conformity factors (the magnitude factor $d_{mag}$ and the angle factor θ) are used as independent variables of the discriminant (Equation 8 below) used for determining a target.

Figure 10:
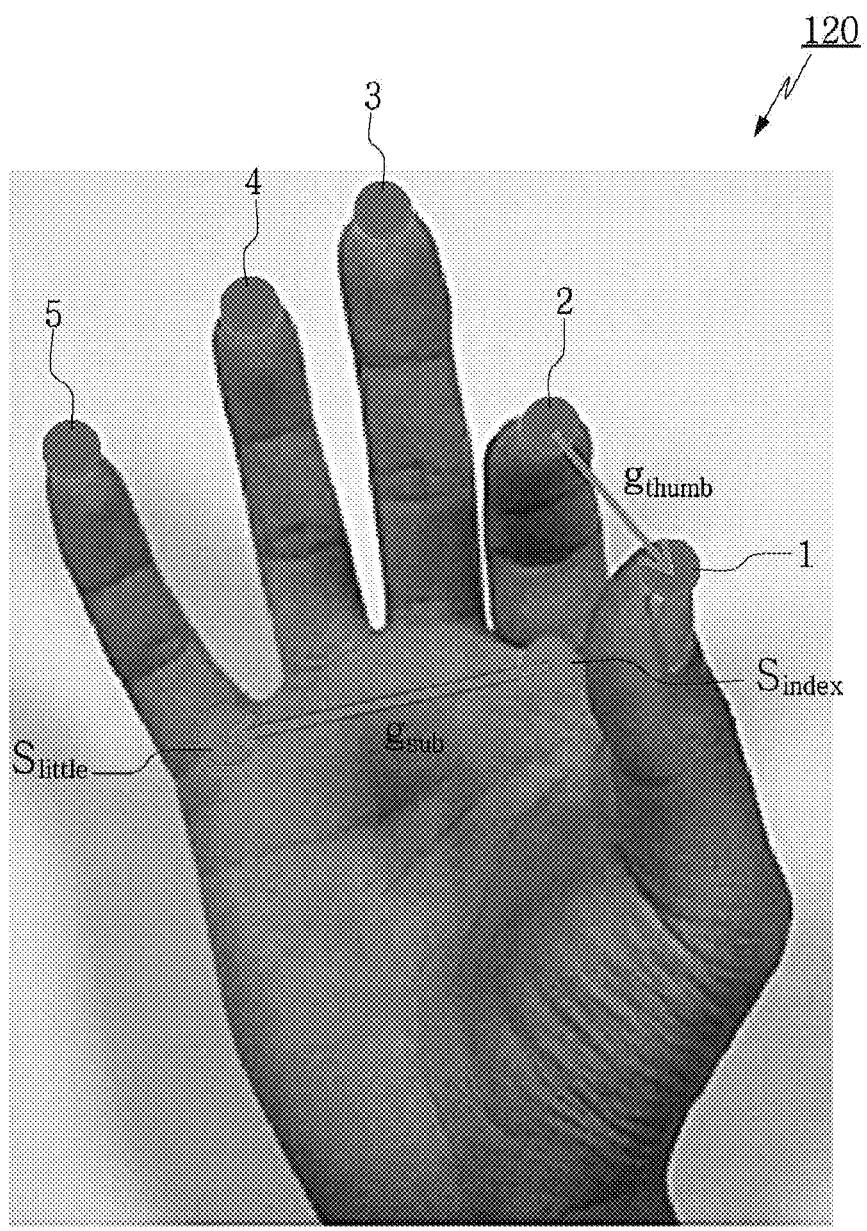
FIG. 10 is a diagram illustrating a method of calculating conformity factors when only two fingers contribute to object selection according to an another embodiment.

FIG. 10 is a diagram illustrating the method of calculating a conformity factor when two fingers contribute to object selection according to another embodiment. In FIG. 10, it is assumed that distances between three fingers (here, a middle finger, a ring finger, and a little finger) and the reference plane (121 of FIG. 6) are larger than the reference distance.

In the embodiment of FIG. 10, because only two fingers, that is, a thumb and an index finger, contribute to grasp, the subvector $g_{sub}$ cannot be determined by the previously described method. Accordingly, in this case, the user interface apparatus (100 of FIG. 1) determines, as a subvector $g_{sub}$, a vector connecting the start point $S_{index}$ of an index finger and the start point $S_{little}$ of a little finger. Also, the user interface apparatus 100 calculates a conformity factor, based on the determined subvector $g_{sub}$ by the method depicted in FIG. 7 and FIG. 9. However, in this case, only the magnitude factor (See $d_{mag}$ of FIG. 9) is calculated as a conformity factor while not calculating an angle factor θ, and hereafter, an angle factor θ is excluded from a discriminant.

That is, the embodiment of FIG. 10 is substantially the same as the embodiments of FIGS. 6 through 9 except that the angle factor θ is not considered when determining the conformity. In this case, the vector connecting the start point $S_{index}$ of an index finger and the start point $S_{little}$ of a little finger is determined to the subvector $g_{sub}$.

Meanwhile, hereinabove, although a series of calculations and computations performed until the conformity factors are calculated from the sensed finger tip locations may be performed by a processor in the hand pose sensing unit 120, the scope of the present disclosure is not limited thereto. For example, such calculation is performed by other part of the user interface apparatus 100 or using a separate external calculation device.

Subsequently, the user interface apparatus 100 determines a target among the objects (131, 132, and the 133 of FIG. 1), based on a discriminant (Equation 8 below) in which the position factor and the conformity factor are referred. The discriminant used to determine a target is represented as Equation 8.

$$\text{cost} = k_{gaze} \cdot d_{gaze} + k_{mag} \cdot d_{mag} + k_{angle} \cdot \theta \quad \text{[Equation 8]}$$

Here, 'cost' represents the weighted sum of factors. It is finally calculated by Equation 8, where $d_{gaze}$ represents the position factor described in Equation 3, $d_{mag}$ represents the magnitude factor of the conformity factors described in Equation 8, $\theta$ represents the angle factor of the conformity factors described in Equation 9, and $k_{gaze}$, $k_{mag}$, and $k_{angle}$ represent weighting coefficients for $d_{gaze}$, $d_{mag}$, and $\theta$, respectively. In this instance, $k_{gaze}$, $k_{mag}$, and $k_{angle}$ may be proper values given arbitrarily by a user or selected by an experiment. Also, units of $k_{gaze}$, $k_{mag}$, and $k_{angle}$ are the inverses of units of $d_{gaze}$, $d_{mag}$, and $\theta$, respectively. For example, when the unit of $d_{gaze}$ is millimeter (mm), the unit of $k_{gaze}$ is per millimeter (/mm or mm$^{-1}$).

The user interface apparatus 100 calculates the cost for each of the objects 131, 132, and 133 by Equation 8, and determines, as a target, the object having the smallest cost by comparing the calculated costs.

Meanwhile, although the above embodiments show that the position factor or the conformity factors is calculated using the object center $p_{obj}$ of the object and the cost for the object, the scope of the present disclosure is not limited thereto. For example, the user interface apparatus 100 may select an object in the manner of setting various reference points in an object, calculating a cost for each of the reference points, selecting the reference point having the smallest cost in the reference points, and determining the object including the selected reference point as a target. This method refers to method for determining a target based on reference point rather than object, so it may be useful when a user take a hand pose for an object with complex shape.

According to the embodiments described hereinabove, the user interface apparatus may select or recognize the target without an extra manipulation only for selecting an object, just by recognizing an eye gaze and a hand pose of the user. Consequently, the extra time required for extra manipulations for selecting an object is eliminated, so the user interface apparatus may operate more quickly, and user intuitiveness and usability may be improved.

Figure 11:
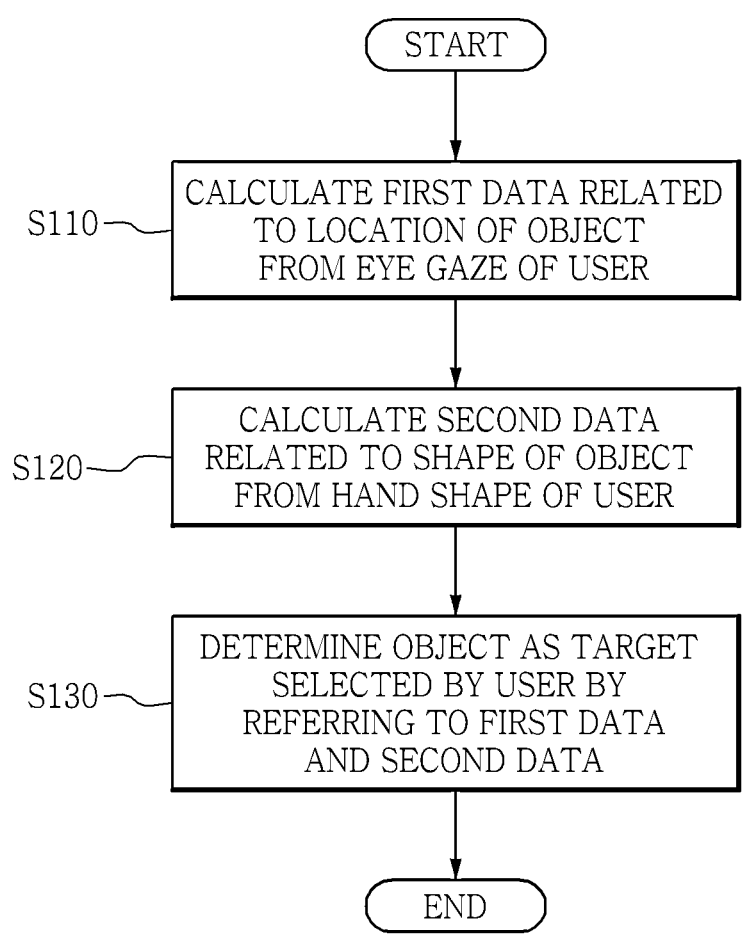
FIG. 11 is a flowchart illustrating a control method of a user interface apparatus according to an embodiment.

FIG. 11 is a flowchart illustrating the control method of the user interface apparatus according to the embodiment. Referring to FIG. 11, the control method of the user interface apparatus includes steps S110 through S130.

In S110, the user interface apparatus 100 calculate the first data related to the location of an object from the eye gaze of a user 200. For this, the user interface apparatus 100 senses or tracks positions $p_L$, $p_R$ of both eyes and gaze directions $g_L$, $g_R$ of both eyes of the user 200 using the eye gaze sensing unit 110, and calculates the midpoint $p_{center}$, the average eye gaze direction $g_{avg}$, the user eye gaze, and the minimum distance $d_{gaze}$ to an object center $p_{obj}$ in a sequential order. The calculated minimum distance $d_{gaze}$ is included in the first data as a position factor.

A detailed method of deriving the minimum distance $d_{gaze}$ from a sensing or tracking result of the eye gaze sensing unit 110 is the same as described in FIGS. 3 and 4.

In S120, the user interface apparatus 100 calculates second data related to conformity of the object with the hand pose of the user 200. For this, the user interface apparatus 100 senses or tracks 3D locations 1, 2, 3, 4, and 5 for each finger tip using the hand pose sensing unit 120, and calculates the normal vector $g_{thumb}$, the reference plane 121, the subvector $g_{sub}$, another normal vector 'n', the projection plane 122, and the center $p_{obj}$ of projection, first through third straight lines L1, L2, and L3, two p1 and p2, the magnitude factor $d_{mag}$, and the angle factor $\theta$ in a sequential order. The calculated magnitude factor $d_{mag}$ and the calculated angle factor $\theta$ are included in the second data as conformity factors.

A detailed method of deriving the magnitude factor $d_{mag}$ and the angle factor $\theta$ from a sensing or tracking result of the hand pose sensing unit 120 is the same as described in FIGS. 6 through 10.

In S130, the user interface apparatus 100 determines, as a target selected by the user, the object having the smallest cost in a plurality of objects by referring to the first data and the second data. In this instance, to calculate the cost for each object, the user interface apparatus 100 substitutes the first data and the second data to the discriminant described in Equation 8.

Figure 12:
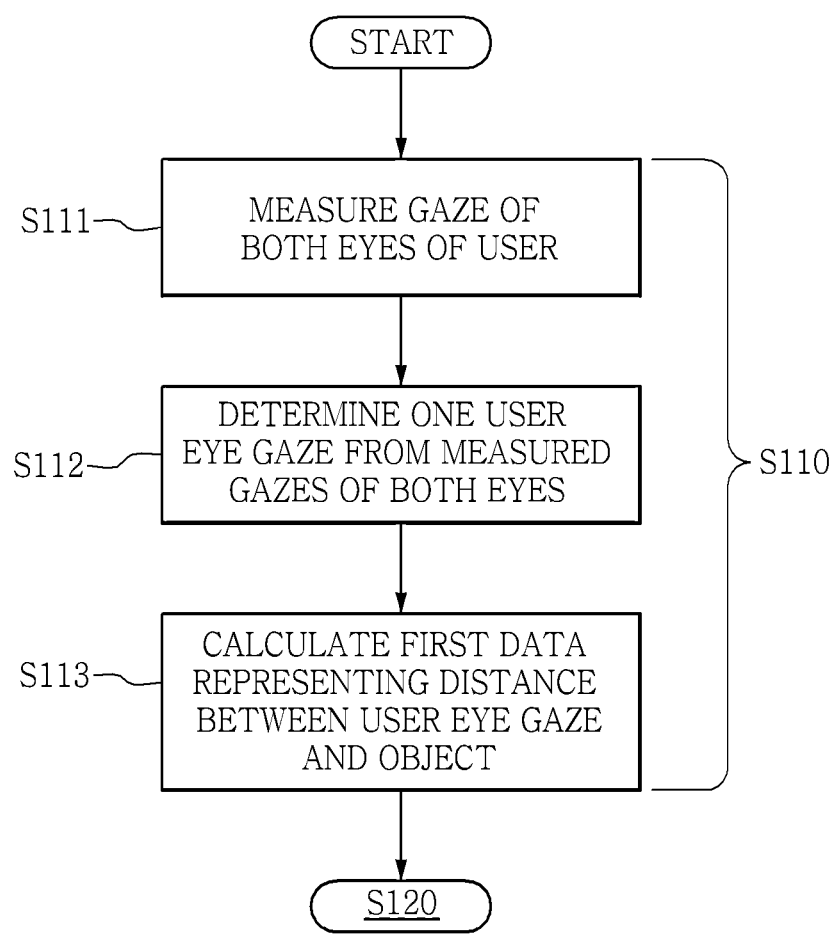
FIG. 12 is a detailed flowchart illustrating step S110 of FIG. 11.

FIG. 12 is a detailed flowchart illustrating step S110 of FIG. 11. Referring to FIG. 12, S110 includes steps S111 through S113.

In S111, the eye gaze sensing unit 110 measures positions $p_L$, $p_R$ of both eyes and gaze directions $g_L$, $g_R$ of both eyes.

In S112, the eye gaze sensing unit 110 determines an average user eye gaze by averaging the measured positions $p_L$, $p_R$ of both eyes and the measured gaze directions $g_L$, $g_R$ of both eyes, respectively. The determined user eye gaze may be represented in Equation 2.

In S113, the eye gaze sensing unit 110 senses the object center $p_{obj}$ of an object, and the user interface apparatus 100 calculates the minimum distance $d_{gaze}$ between the object center $p_{obj}$ and the user eye gaze as the first data. The calculated minimum distance $d_{gaze}$ may be used as a position factor for determining a target.

Figure 13:
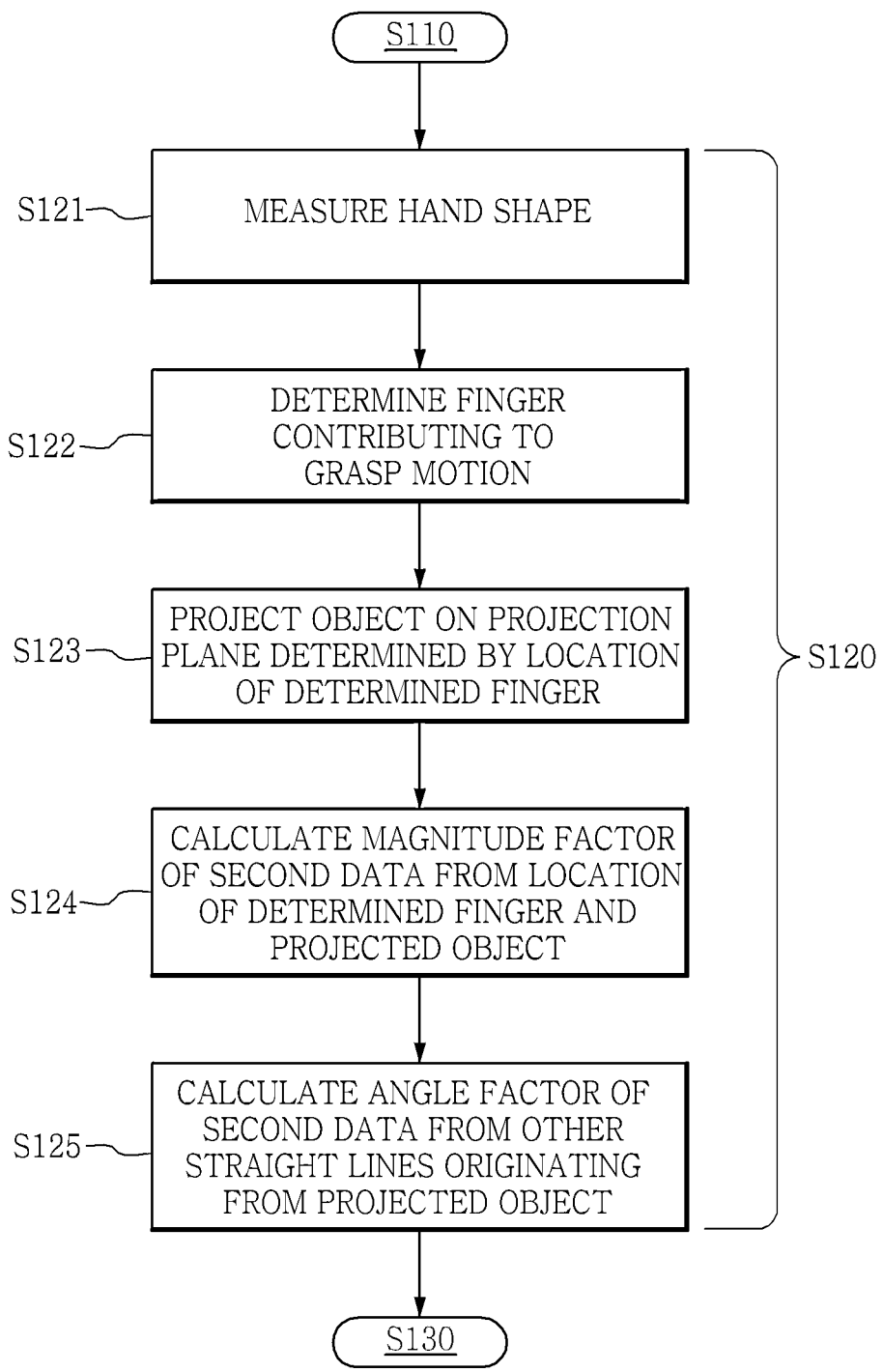
FIG. 13 is a detailed flowchart illustrating step S120 of FIG. 11.

FIG. 13 is a detailed flowchart illustrating step S120 of FIG. 11. Referring to FIG. 13, S120 includes steps S121 through S125.

In S121, the hand shape sensing unit 120 measures hand pose, for example, tip locations 1, 2, 3, 4, and 5 for each finger.

In S122, the user interface apparatus 100 determines the normal vector $g_{thumb}$ and the reference plane 121 using the tip locations 1, 2, 3, 4, and 5 of the fingers, and determines the fingers contributing to a grasp motion using distances between the reference plane 121 and the tip locations.

In S123, the user interface apparatus 100 determines the subvector $g_{sub}$, the normal vector 'n', and the projection plane 122 in a sequential order using the tip location of the finger participating in the grasp motion, and projects the object on the determined projection plane 122.

In S124, the user interface apparatus 100 determines two points p1 and p2 based on the first straight line L1 which is determined by the tip location of the fingers participating in grasp and the outline of the projection of the object. And, the user interface apparatus 100 calculates the distance between the two points p1 and p2 and the distance between the thumb tip location and a finger tip location closest from the thumb tip location as the magnitude factor of second data.

In S125, the user interface apparatus 100 determines the second straight line L2 and the third straight line L3 based on the second point p2, and calculates the angle between the second straight line L2 and the third straight line L3. The calculated angle becomes the angle factor $\theta$ of the second data.

Figure 14:
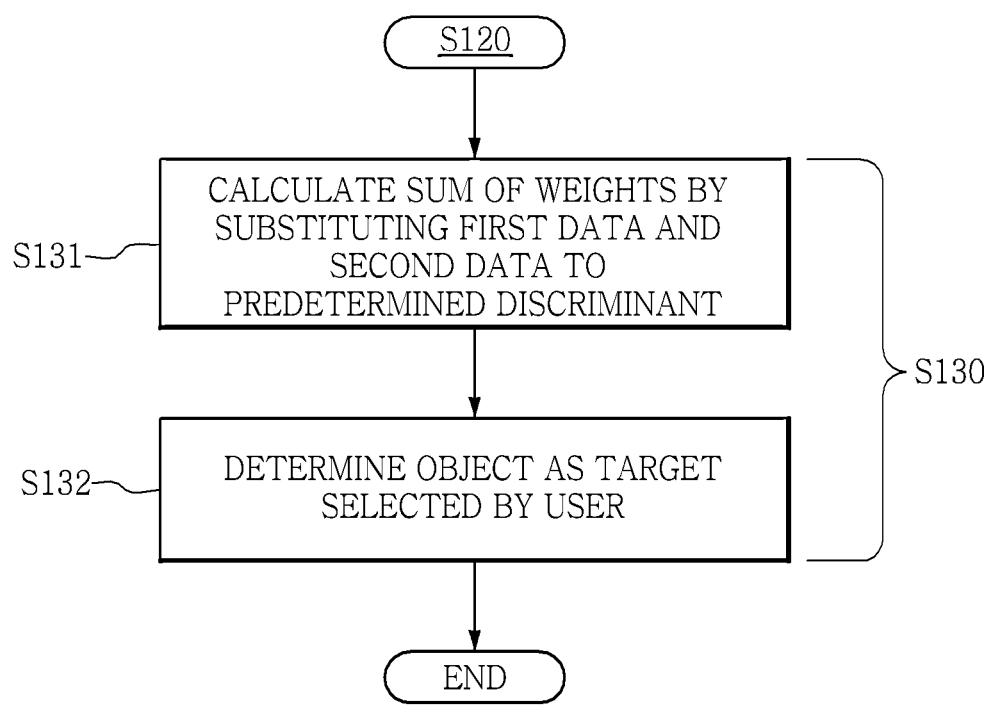
FIG. 14 is a detailed flowchart illustrating step S130 of FIG. 11.

FIG. 14 is a detailed flowchart illustrating step S130 of FIG. 11. Referring to FIG. 14, S130 includes steps S131 and S132.

In S131, the weighted sum of the position factor, the magnitude factor, and the angle factor of the object is calculated as the cost by using the predetermined discriminant.

In S132, the calculated cost of the object is compared to costs of other objects, and among the compared objects, an object having the smallest cost is determined as a target selected by the user.

According to the embodiments described hereinabove, the user interface apparatus may select or recognize the target which the user intends to select, without an extra manipulation only for selecting an object, just by recognizing an eye gaze and a hand pose of the user. Consequently, the extra time required for extra manipulations for selecting an object is eliminated, so the user interface apparatus may operate more quickly. Further, user intuitiveness and usability may be improved since the user interface apparatus recognizes a target in the more intuitive way compared to the conventional arts.

Meanwhile, although the eye gaze sensing unit 110 and the hand pose sensing unit 120 are described herein as separate and independent modules, the scope of the present disclosure is not limited thereto. For example, the eye gaze sensing unit 110 and the hand pose sensing unit 120 may be embedded together in a hardware device, or may be implemented as a single module into which functions of both of them are integrated. Further, the integrated module may be also embedded in the display unit 130.

While specific embodiments have been shown and described in the detailed description of the specification, it will be understood that various changes in form and details may be made to each embodiment within the scope of the specification.

Moreover, it should be noted that the languages used in the specification has been principally selected for readability and instructional purpose, and not to limit the scope of the subject matter disclosed herein. Accordingly, the scope of the subject matter is not confined to the disclosed embodiments, which is set forth in the following claims.

What is claimed is:

1. A user interface apparatus, comprising:
    an eye gaze sensing unit configured to sense eye positions and eye gaze directions of a user; and
    a hand pose sensing unit configured to sense a hand pose of the user,
    wherein the user interface apparatus is configured to calculate a position factor related to a location of an object based on the eye positions and the eye gaze directions, to calculate at least one conformity factor related to conformity of the object with the hand pose, to determine the object as a target selected by the user based on the calculated position factor and the at least one conformity factor, to calculate a cost of the object by substituting the position factor and the at least one conformity factor to a predetermined discriminant, and to determined the object as the target by comparing the cost of the object to a cost of another object, and
    wherein the discriminant is as follows:
    $$\text{cost} = k_{gaze} \cdot d_{gaze} + k_{mag} \cdot d_{mag} + k_{angle} \cdot \theta.$$

2. The user interface apparatus according to claim 1, wherein the user interface apparatus is configured to determine a user eye gaze based on the eye positions and the eye gaze directions, and to calculate the position factor using the minimum distance between the user eye gaze and the object.

3. The user interface apparatus according to claim 2, wherein the user eye gaze is a half line that starts from the midpoint of the eye positions and goes in an average direction of the eye gaze directions.

4. The user interface apparatus according to claim 1, wherein the user interface apparatus is further configured to calculate the at least one conformity factor based on the conformity of the object with the hand pose or the conformity of the modification product which have modified geometry of the object and the hand pose,
    wherein the hand pose represents an appearance of a hand comprising a pose of the hand, a size of the hand, a location of each part of the hand, a relative location between the parts of the hand, an extent to which each part of the hand is bent, or an angle recognized from the appearance of the hand, and
    wherein the shape of the object or the modification product comprises an appearance and a size of the object or the modification product, or an angle recognized from the appearance of the object or the modification product.

5. The user interface apparatus according to claim 1, further comprising:
    a display unit configured to display the object.

6. The user interface apparatus according to claim 5, wherein the object is a stereoscopic image or a stereoscopic product configured to be displayed in three dimensions by an image display.

7. The user interface apparatus according to claim 3, wherein midpoint of the eye positions and average direction of the eye gaze directions are calculated as follows:

$$p_{center} = \frac{p_L + p_R}{2}$$

$$g_{avg} = \frac{g_L + g_R}{2}$$

* * * * *